United States Patent [19]

Bosley et al.

[11] Patent Number: 5,559,381
[45] Date of Patent: Sep. 24, 1996

[54] FLYWHEEL SUPPORT SYSTEM FOR MOBILE ENERGY STORAGE

[75] Inventors: Robert W. Bosley, Cerritos; Harold A. Rosen, Santa Monica, both of Calif.

[73] Assignee: Rosen Motors, L.P., Tarzana, Calif.

[21] Appl. No.: 148,361

[22] Filed: Nov. 8, 1993

[51] Int. Cl.⁶ ............................. H02K 7/02; H02K 7/09
[52] U.S. Cl. ............................................. 310/34; 310/90.5
[58] Field of Search ........................ 310/74, 90.5, 112, 310/113; 322/4; 244/165; 74/572; 280/217; 180/165; 318/161, 150

[56] References Cited

U.S. PATENT DOCUMENTS

| | | | |
|---|---|---|---|
| 3,683,216 | 8/1972 | Post | 310/74 |
| 3,741,034 | 6/1973 | Post | 74/572 |
| 3,955,858 | 5/1976 | Poubeau | 310/90.5 |
| 4,075,542 | 2/1978 | Szegedy | 318/161 |
| 4,211,452 | 7/1980 | Poubeau | 310/90.5 |
| 4,241,654 | 12/1980 | van der Lely | 74/572 |
| 4,266,442 | 5/1981 | Zorzi | 74/572 |
| 4,285,251 | 8/1981 | Swartout | 74/572 |
| 4,363,525 | 12/1982 | Poubeau | 310/90.5 |
| 4,444,444 | 4/1984 | Benedetti et al. | 310/90.5 |
| 4,511,190 | 4/1985 | Caye et al. | 310/74 |
| 4,603,555 | 8/1986 | Mayer | 74/609 |
| 4,723,735 | 2/1988 | Eisenhaure et al. | 310/90.5 |
| 4,860,611 | 8/1989 | Flanagan et al. | 74/572 |
| 5,214,981 | 6/1993 | Weinberger et al. | 74/572 |
| 5,245,270 | 9/1993 | Akiyama | 322/4 |

Primary Examiner—Clayton E. LaBalle
Attorney, Agent, or Firm—Sughrue, Mion, Zinn, Macpeak & Seas

[57] ABSTRACT

A flywheel support system isolates the flywheel and its motor-generator from the driving environment of an electrically powered motor vehicle. A suitable liquid, placed between the outer and vacuum housings of the flywheel assembly, provides buoyancy and damping to the vacuum housing, cooling of the motor-generator, and serves as one of the barriers to rotor energy and angular momentum transfer in the event of an accident or failure. During normal operation, a shearable mechanical gimbal system keeps the vacuum housing centered in the outer housing, reacts the spin moments generated by the motor-generator, and provides a path for the electrical leads into the vacuum housing. In the event of bearing seizure or rotor failure, the mechanical gimbal will shear and allow the vacuum housing to gradually spin down against the fluid. A system of both active and passive axial and radial magnetic bearings supports the rotating assembly including the rotor of the motor-generator. Rotor-stator gap proximity sensors, strategically placed along the axis, permit a minimum gap to be used in the motor-generator. The placement of the center of gravity of the vacuum housing and its contents below the center of buoyancy produces a vertical orientation of the housing in the absence of accelerations, thus minimizing the power consumed by the magnetic support system when the vehicle is parked.

20 Claims, 9 Drawing Sheets

FLYWHEEL SUPPORT SYSTEM FOR MOBILE ENERGY STORAGE

FIELD OF THE INVENTION

The present invention relates generally to a flywheel energy storage device. More specifically, the present invention is related to a flywheel-motor-generator combination providing surge power, dynamic braking, and energy storage. The present invention is particularly advantageous when adapted for use in a hybrid electric motor vehicle.

BACKGROUND OF THE INVENTION

Modern high strength-to-weight ratio fibers make it possible to construct high energy density flywheels, which, when combined with a high power motor-generators, are an attractive alternative to electrochemical batteries for use as energy buffers in hybrid electric vehicles. A properly designed flywheel system would provide higher energy density, higher power density, higher efficiency, and longer life than a conventional electrochemical battery.

The vehicle environment, however, presents special challenges to successful implementation of a flywheel to motor vehicle applications. Among these challenges are the need to deal with the gyroscopic torques resulting from the vehicle's angular motions and the need to compensate for translational accelerations of the vehicle. Several safety issues resulting from the high energy and momentum stored in the flywheel also need to be taken into account, as does the difficulty of cooling the motor-generator operating in a vacuum chamber. In addition, energy conservation considerations and user convenience dictate the requirement that the flywheel storage system possess a slow self-discharge rate.

Flywheel energy storage systems have been proposed for many years; many of the storage systems have even been proposed for use in motor vehicles. U.S. Pat. No. 3,741,034, for example, discloses a flywheel contained in an evacuated sphere which is surrounded by a liquid and having various safety features. However, the '034 patent does not address waste heat production and the requirement for cooling the motor-generator. In addition, the '034 patent does not address itself to the dynamics of the driving environment, or the minimization of the power drain when parked.

U.S. Pat. Nos. 4,266,442, 4,285,251 and 4,860,611, on the other hand, disclose different ways of constructing high speed rotors. However, the above referenced patents do not recognize, let alone describe, design features needed for compatibility with the environment of a motor vehicle.

The present invention was motivated by a desire to correct the perceived weaknesses and identified problems associated with conventional flywheel energy storage systems.

SUMMARY OF THE INVENTION

The principle purpose of the present invention is to provide a support system for a flywheel that is optimized for the motor vehicle environment.

An object to the present invention is to provide isolation for the flywheel from the vehicle's angular motions.

Another object of the present invention is to provide support for the rotor during omni-directional accelerations.

Yet another object of the present invention is to provide an efficient and compact cooling system for the motor-generator.

Another object of the present invention is to provide protection for the vehicle in which it is contained from accidental release of stored energy and angular momentum.

Still another object of the present invention is to provide an energy storage device having a slow self-discharge rate.

These and other objects, features and advantages of the present invention are accomplished by a flywheel energy storage system including a fiber composite energy storing rotor, a high power, liquid cooled motor-generator supported by magnetic bearings in an evacuated sphere, which sphere floats in a liquid contained in an outer spherical housing. The energy storage system includes a flywheel-motor-generator assembly having a low center of mass location with respect to the evacuated sphere so as to provide a vertical orientation of the flywheel-motor-generator along a rotor axis.

These and other features of the present invention will become more apparent from the following detailed description, as illustrated in the accompanying drawings.

BRIEF DESCRIPTION OF THE DRAWINGS

The preferred embodiments are described with reference to the drawings, in which like elements are denoted by like numbers, and in which.

DESCRIPTION OF THE PREFERRED EMBODIMENTS

Figure 1:
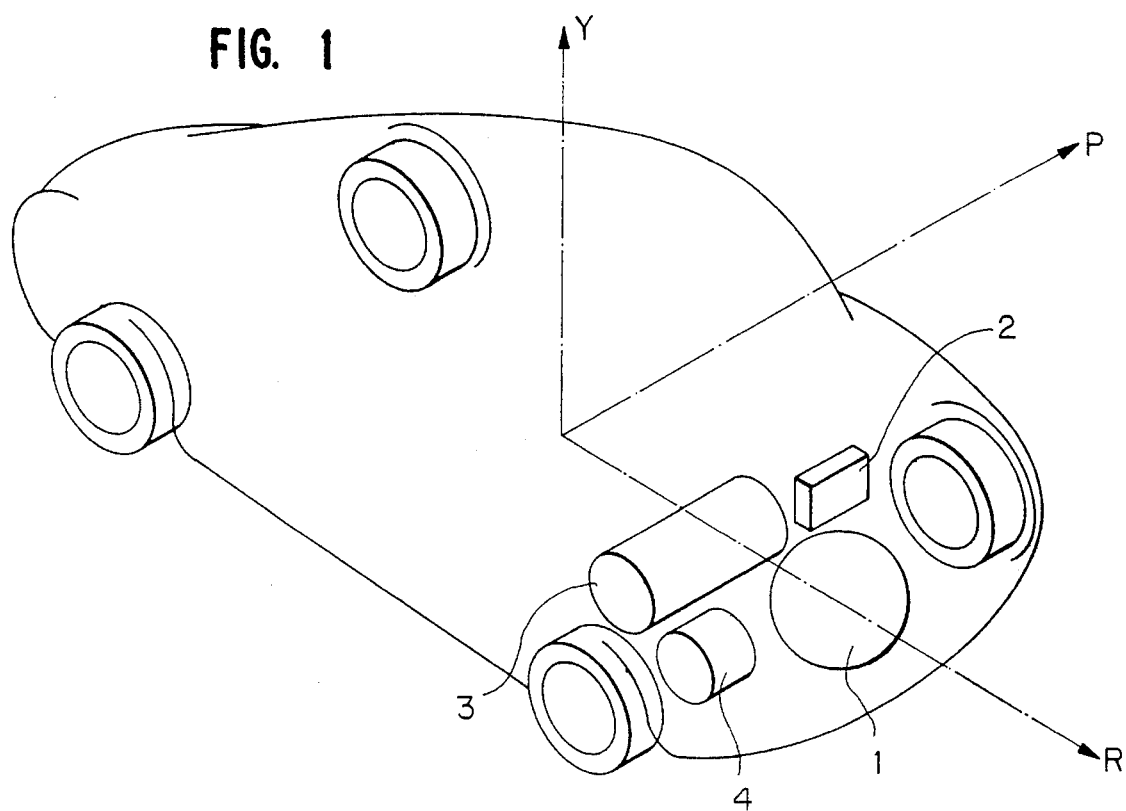
FIG. 1 is a cutaway sketch of a hybrid electric vehicle showing the elements of its power train.

FIG. 1 shows the power train elements of a hybrid electric vehicle using a flywheel (1) as an energy buffer. In this configuration, the flywheel (1) provides surge power for accelerating the vehicle and for hill climbing, complementing the relatively low, steady power provided by a fuel-burning power source (3), e.g., a turbo-generator set. The flywheel (1) is also used to absorb energy by storing it during dynamic braking and downhill driving. An electric motor (4) converts the electric power from either the flywheel (1) or power source (2) to mechanical motive power. Preferably, all of these elements are regulated by the electronic controller (2).

Figure 2:
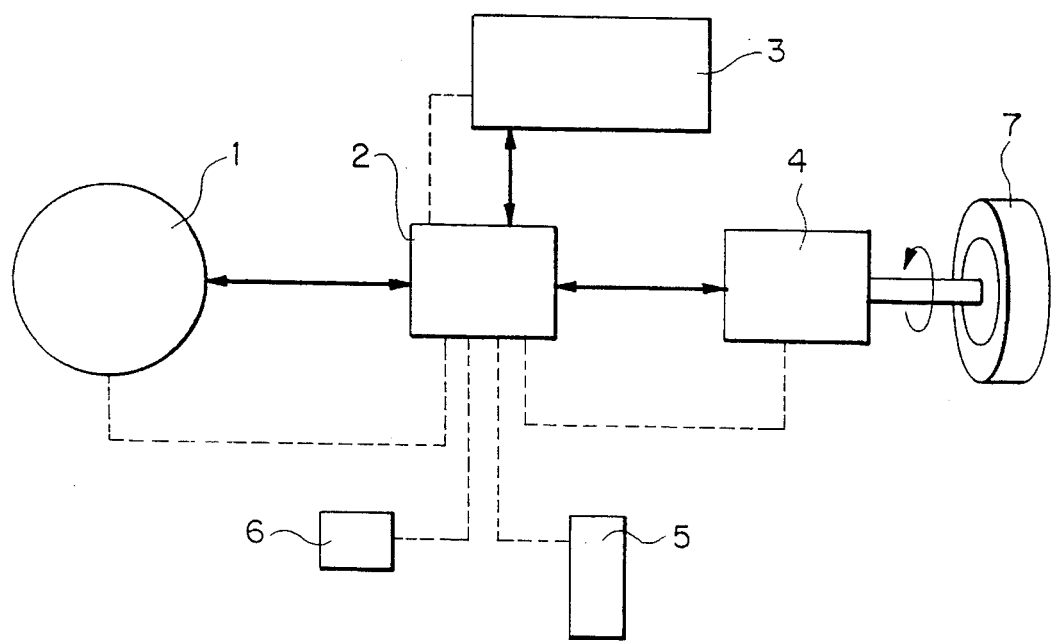
FIG. 2 is a high level block diagram illustrating the power control system of the vehicle shown in FIG. 1.

FIG. 2 is high level a block diagram of a power control system showing how the electronic controller (2) regulates the vehicle's power flow in response to the driver's inputs, which inputs are supplied by the accelerator pedal (5) and the brake pedal (6). Controller (2) channels power to the drive motor (4) from the turbo-generator (3) during cruise conditions and augments this power with power from flywheel (1) for accelerating or hill climbing. Controller (2) advantageously charges the flywheel (1) with power from the drive motor (4) which is acting as a generator during braking or downhill driving. Preferably, controller (2) maintains the speed of flywheel (1) within a predetermined range by charging it from power source (2) to avoid its lower limit or giving flywheel (1) a higher share of the driving load to thus avoid the flywheel's (1) upper limit. Controller (2) also channels power from the flywheel (1) to the power source (4) for starting. In FIG. 2, power leads are designated by solid lines and signal leads are designated by dashed lines.

Figure 3:
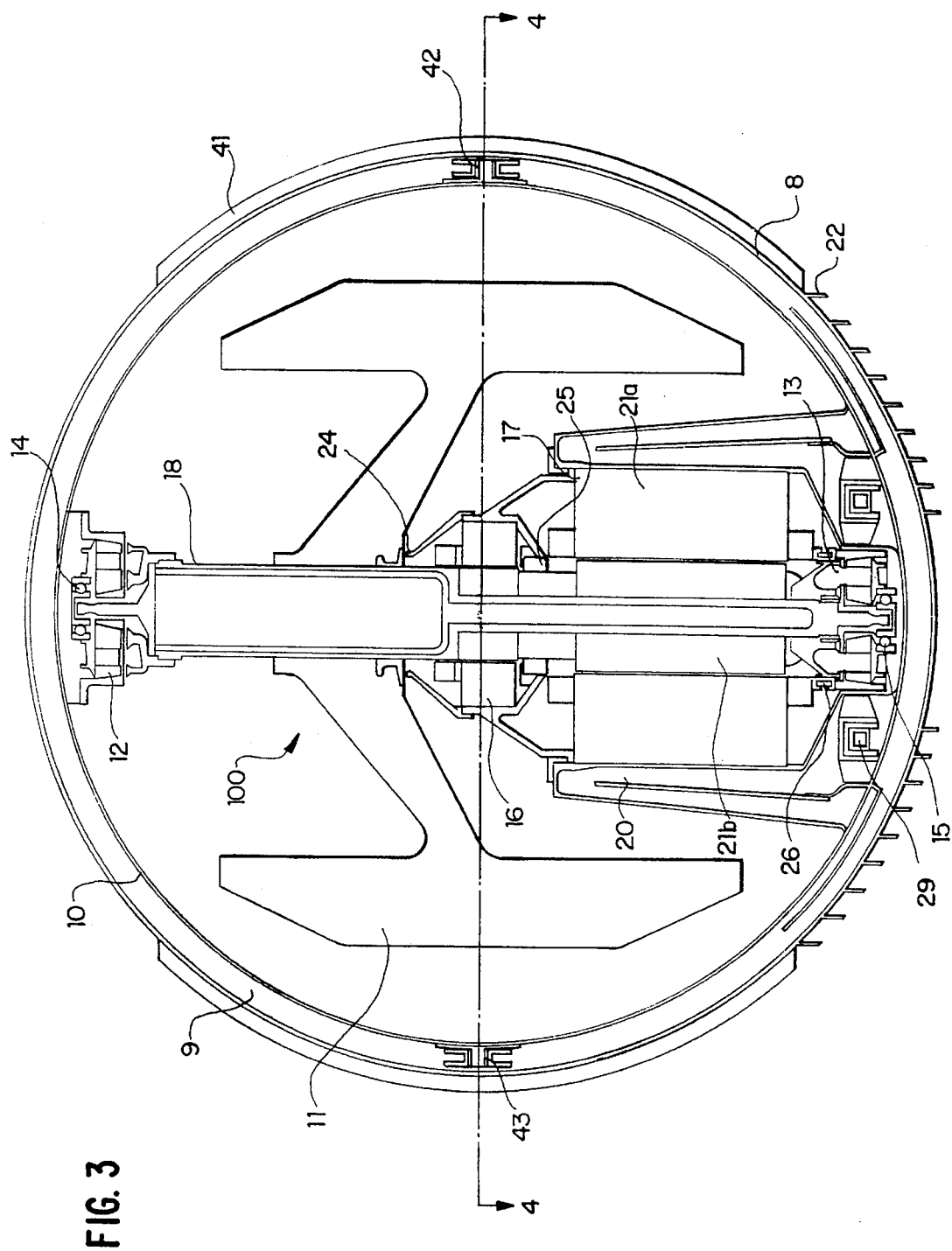
FIG. 3 shows the general arrangement of a flywheel assembly according to the present invention.

FIG. 3 is a cross-sectional view of the entire flywheel assembly showing the general arrangement of its parts. An outer housing (8) surrounds the assembly and provides mechanical and electrical connections to the vehicle. The space between housing (8) and a vacuum housing (10) is filled with a liquid (9), e.g., ethylene glycol, in which the vacuum housing (10) floats. The rotating assembly (100) includes a metal shaft (18) and is supported by a system of magnetic bearings (12), (13), and (16). Preferably, assembly (100) is powered by a motor-generator (17) including rotor (21a) and a stator (21b) which stator is in contact with the re-entrant portion (20) of the vacuum housing. Proximity sensors (24), (25), and (26) provide control signals to the magnetic bearings as described in greater detail below.

The fiber composite structure (11) of assembly (100) stores energy in the form of rotational kinetic energy. Back-up ball bearings (14) and (15) advantageously are provided to support the rotor during occasional, brief overloads of the magnetic bearings.

It will be noted that bearings (42) and (43) are part of the mechanical gimbal system. A pump assembly (29) is part of the liquid cooling system for the motor-generator (17). The outer Kevlar wrapping (41) provides added protection against accidents.

Figure 4:
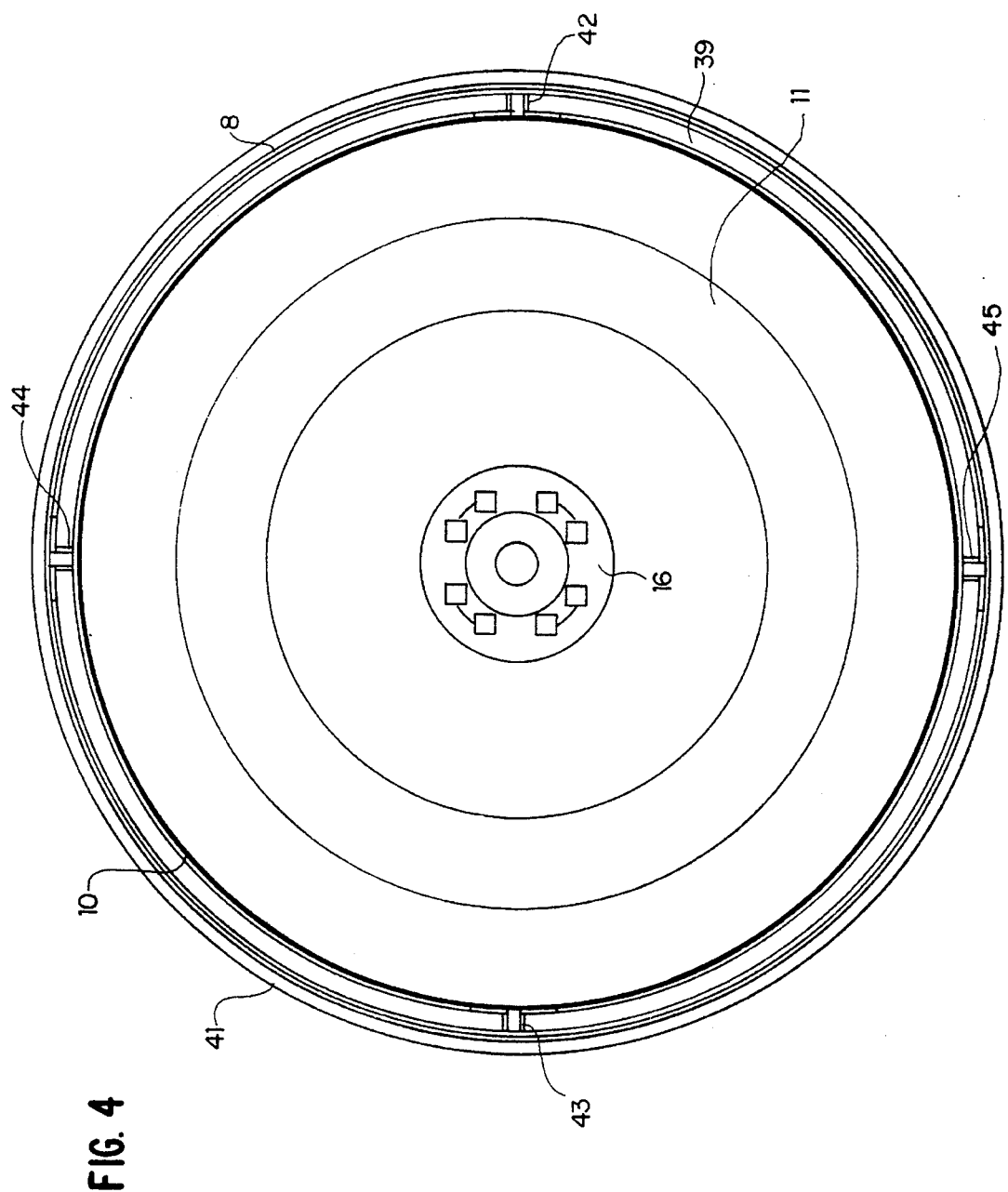
FIG. 4 is a cross sectional view taken perpendicular to the axis of the flywheel illustrated in FIG. 3.

FIG. 4 is a section perpendicular to the axis of rotation, showing the arrangement of electro-magnets comprising the four force generators comprising the active radial magnetic bearing (16). The vector sum of the forces produced by currents in two orthogonal coils advantageously can produce a force in any desired radial direction as explained in greater detail below.

Figure 5A:
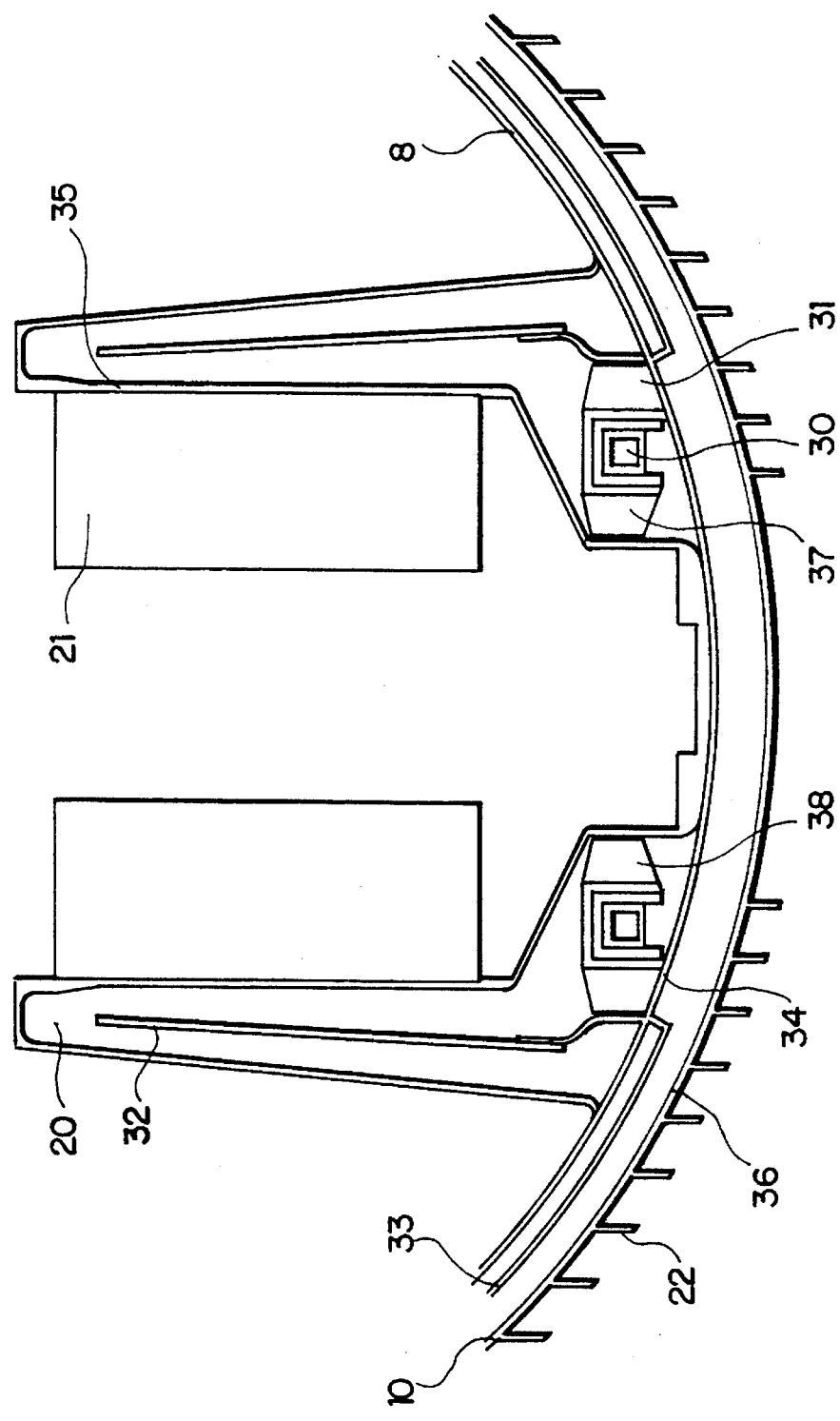
FIGS. 5A and 5B collectively form an illustration which is useful in explaining the operation of a motor-generator cooling system according to the present invention.
Figure 5B:
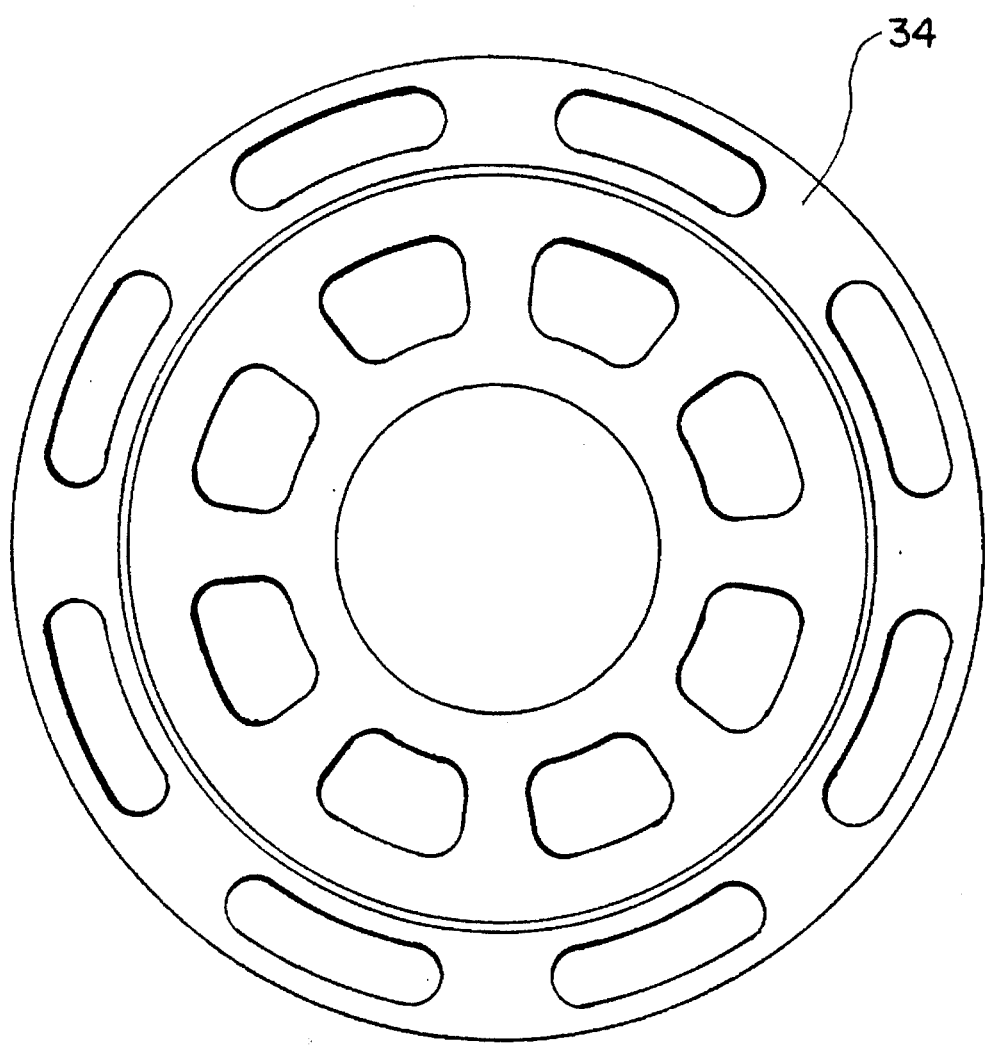

FIGS. 5A and 5B show the elements of the cooling system for the motor-generator (17). An annular passageway (20) surrounds the stator (21) of the motor-generator (17), connects with the space between the housings (8) and (10) and permits the flotation liquid (9) to transport the heat developed in the motor-generator (17) to the region of the outer housing (8) containing a radiator (22) through apertures in a south polar cap (34) shown in FIG. 5A. The circulation of the liquid (9) in this region is effected by the pump assembly (29), whose annular wound stator (30) rotates turbine blades (31) and (38) attached to the permanent magnet rotor (37). The circulation of liquid (9) throughout the rest of the annular space between housings (8) and (10) occurs by convection.

Figure 6:
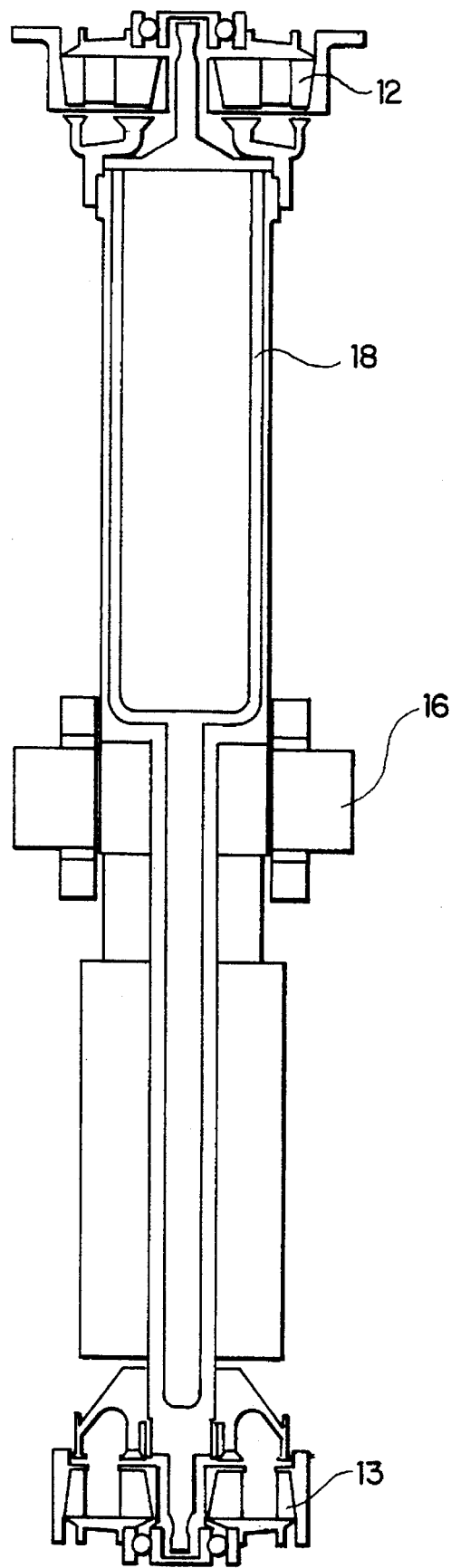
FIG. 6 is an illustration which is useful in explaining the arrangement and operation of a magnetic bearing system according to the present invention.
Figure 7A:
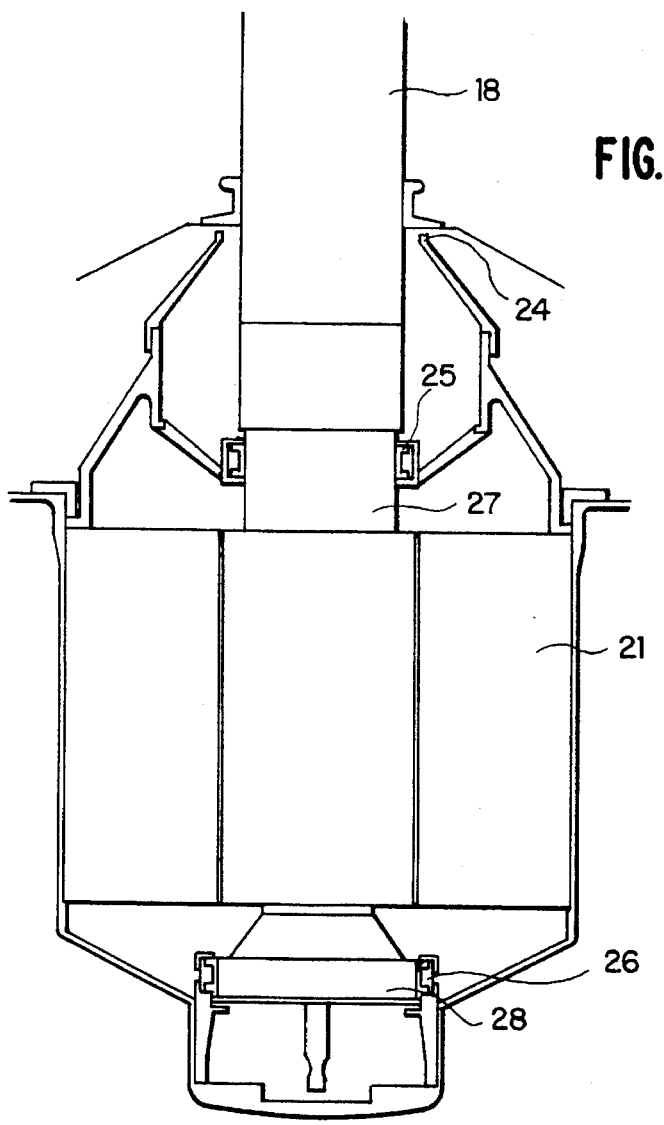
FIG. 7A–7D jointly form an illustration showing one possible arrangement of proximity sensors disposed about a rotor which is useful in explaining the operation of the magnetic bearing system.
Figure 7B:
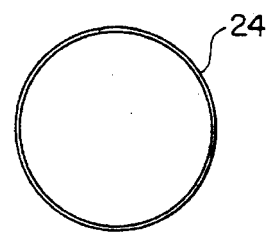
Figure 7C:
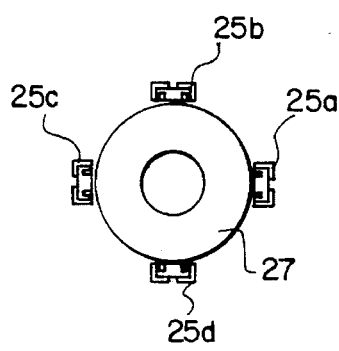
Figure 7D:
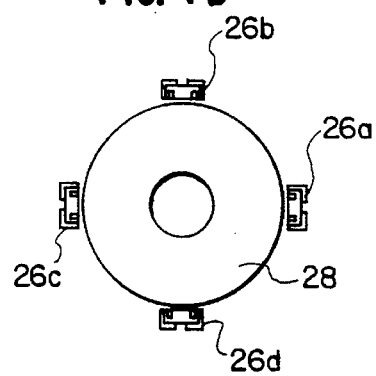

FIG. 6 highlights the elements of the magnetic bearing system, which includes an upper passive radial, axial bearing (12), a lower passive radial, active axial bearing (13), and an active radial bearing (16), the latter being located at the center of mass of the rotor assembly (100).

Axial bearing (12) includes both a permanent magnet and an electromagnet thus constituting both an active axial bearing and a passive axial bearing.

FIGS. 7A–7D show arrangements of the proximity sensors (24), (25), and (26) used to control the active magnetic bearings (12), (13) and (16). The axial sensor (24) controls through suitable logic the currents in the coils of bearings (12) and (13), while the radial sensors (25) and (26) control current in radial bearing (16).

Figure 8A:
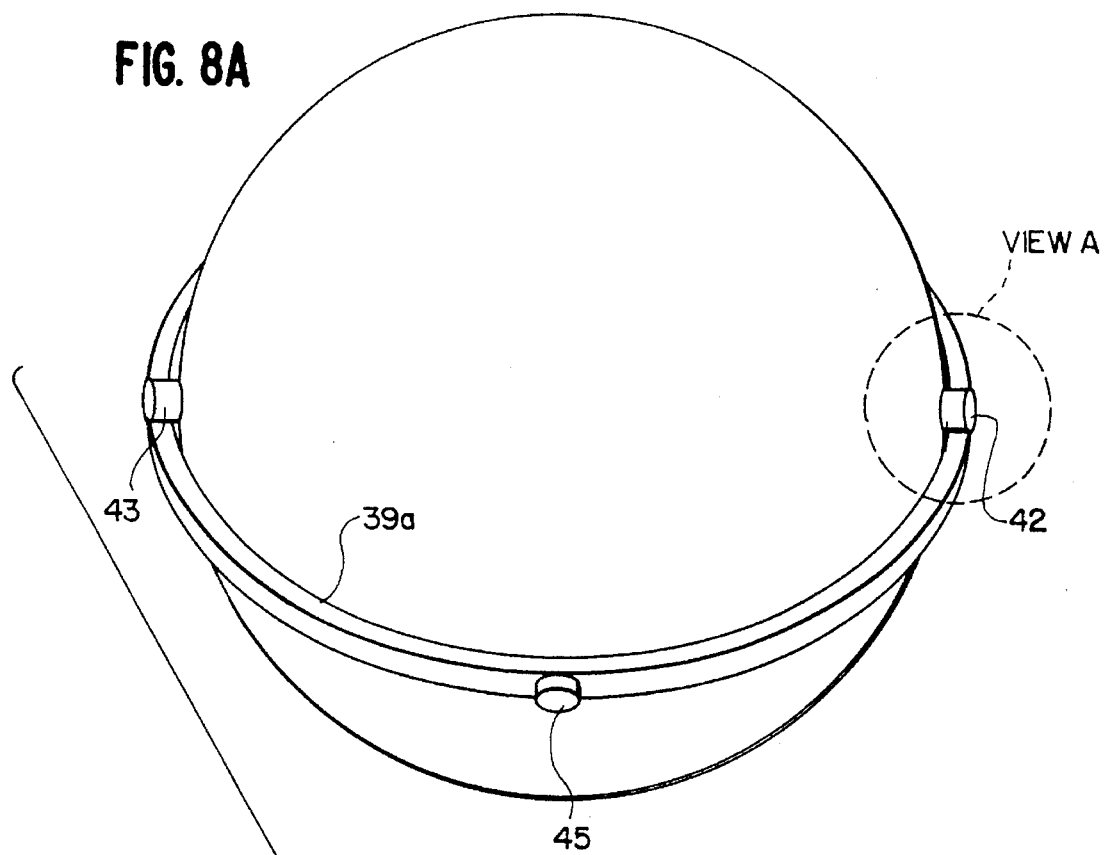
FIG. 8A and 8B provide several views illustrating a mechanical gimbal and routing of power leads in conjunction with the gimbal according to the present invention.
Figure 8B:
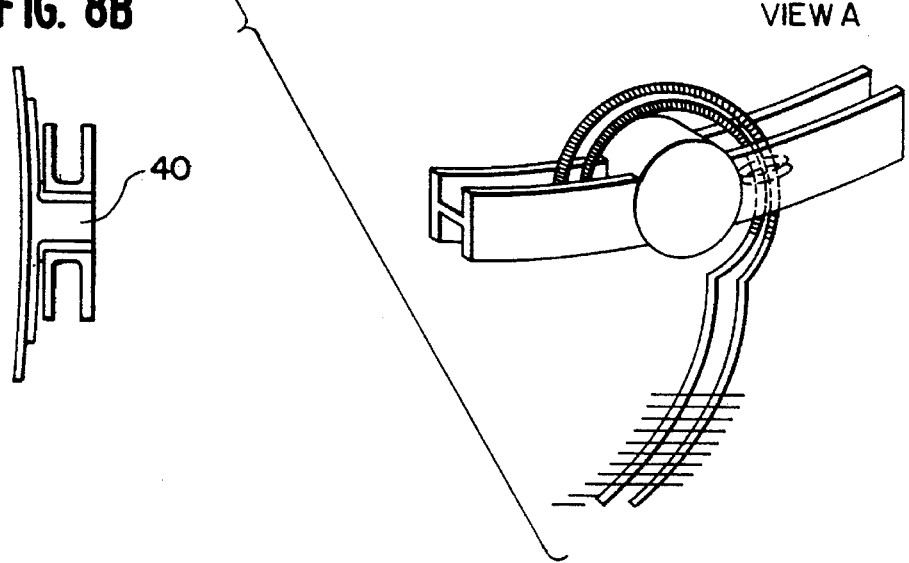

FIGS. 8A and 8B illustrates a mechanical gimbal system (39a), whose function is to keep the vacuum housing (10) centered in the outer housing (8) and to react the spin torques generated by the motor-generator (17). Gimbal (39a) also provides a path for routing the electrical leads between the housings. These leads are dressed around the gimbal axes in such a way as to minimize the torque exerted on the vacuum housing. The gimbal bearings contain pins (40) which shear under torsional overload and, thus, providing protection to the vehicle against sudden momentum transfer in the event of bearing failure.

The operation of the flywheel-motor-generator assembly will now be described in detail.

An object of the support system is to permit the flywheel (1) to safely perform its function as an energy buffer during all driving conditions, while consuming negligible power when the vehicle is parked, even on a steep hill. Since the surface speed of the rotor (100) may exceed 1200 meters per second at peak charge, the rotor (100) must be in a vacuum. Magnetic bearings are the only known bearings capable of long life under these conditions, and hence are used in flywheel (1). Compared to conventional bearings, magnetic bearings have low stiffness and low load capacity. Back-up (or touchdown) ball bearings advantageously are provided to handle extraordinary loads. It will be noted that frequent use of these ball bearings would result in early failure.

The support system keeps the rotor (100) supported by the magnetic bearings despite the rotations and accelerations of the vehicle. Placing the vacuum housing (10) in a gimbal system (39) makes the flywheel (1) nearly impervious to vehicle rotations. If the flywheel (1) were not gimballed, a vehicle rotation would cause a gyroscopic torque of magnitude H(dP/dt), where H is the angular momentum of the flywheel (1) and dP/dt is the pitch or roll angular velocity of the vehicle. The reaction at each passive radial bearing of the unit depicted in FIG. 3, which preferably is capable of storing 2 KWH of energy at full charge, would be 6000 newtons per radian per second of vehicle pitching or rolling. It will be appreciated that this represents a load beyond the capabilities of practical magnetic bearings on all but the smoothest of roads. The use of the gimbal system (39) reduces the moments exerted on the bearings to those produced by hydrodynamic forces on the vacuum housing (10) and the spring forces produced by the power leads. Because the liquid (9) provides neutral buoyancy to the inner housing, the mechanical gimbal (39a) need not support the acceleration loads, i.e., these loads advantageously are borne by liquid (9). The mechanical gimbal (39a) need only react the spin-up and spin-down torques developed by the motor-generator (17), which are 12.5 newton-meters when the flywheel (1) is delivering or accepting 80 kilowatts of power at its quiescent operating speed of 6400 radians per second. Thus, gimbal (39) preferably can have a small enough drag area to make the hydrodynamic torques it develops during vehicle pitching and rolling acceptable.

During steady driving the orientation of the rotor axis is vertical, a consequence of the center of mass of the vacuum housing (10) and its contents being below the center of buoyancy. In this orientation, the radial forces on the bearings due to gravity are zero, and the net force produced by the axial bearings is the weight of the rotor. When the vehicle accelerates or brakes, the active radial bearing (16) bears this radial load by providing current to the appropriate force generators in response to the error signals developed by the radial proximity sensors (25) and (26). The passive radial bearings (12) and (13) advantageously are only affected by the torque caused by the aforementioned center of mass location, which produces a passive radial bearing force much smaller than that borne by the active radial bearing (16). The acceleration causes a rotation of the axis of the vacuum housing (10) relative to that of the rotor (21b) and stator (21a) of the motor-generator (17) by an amount proportional to the axial distance between the center of rotation and the position where the clearance is measured. The reduction in clearance is thus minimized when the center of rotation is at the center of the motor-generator (17).

Figure 9:
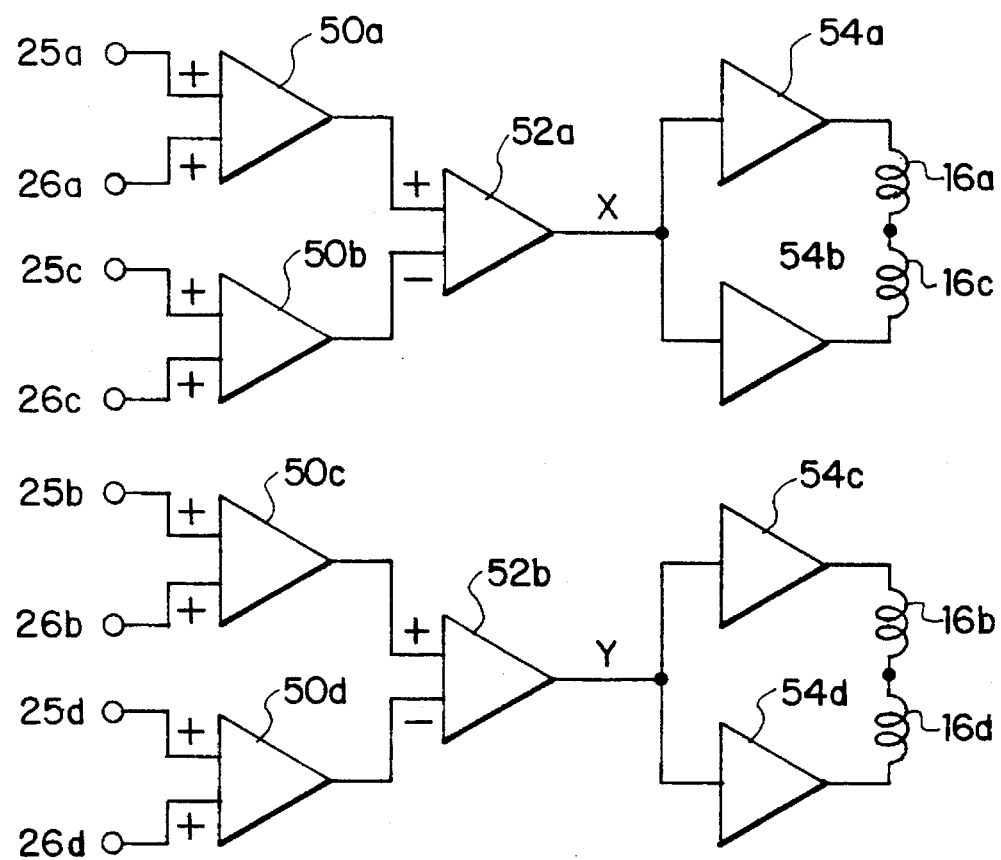
FIG. 9 is a simplified circuit diagram which is useful in explaining the operation of the magnetic bearing system of FIG. 6 according to the present invention.

If the axial location of the radial proximity sensors (25) and (26) were at the center of the motor-generator (17), nulling their output with the radial force generators would suffice to accomplish this. It will be noted that such a location would be difficult to implement, however, because of interference with the sensor signals by the strong motor-generator fields. Dual sets of sensors (25) and (26) symmetrically placed at the ends of the motor-generator (17) advantageously are used to create a virtual centrally located sensor, by processing the sensor signals as shown in the block diagram of FIG. 9 using the mechanical arrangement of the sensors shown in FIGS. 7C and 7D. The addition of sensors 25c and 26c subtracted from the addition of sensors 25a and 26a yields the x-axis error, which is driven to zero by the currents produced in force generators 16a and 16c, which are illustrated in FIG. 4. A similar combination of y-axis signals and force generators drives the y-axis error to zero. These orthogonal radial axes are at the axial center of the motor-generator (17) because of the symmetric arrangement of the sensors (25) and (26) and the rotor-stator gap at this location is thus prevented from changing. The clearance reduction at the ends of the motor-generator (17) is thus minimized, which results in a more efficient motor-generator (17) due to the smaller gap.

When the vehicle is accelerating or braking, the spin axis is no longer vertical, aligning itself, after a transient, to the equivalent gravitational field which is the vector sum of the earth's gravitational acceleration and the vehicle's acceleration. Thus, the bearing load during steady accelerations is borne by the axial bearings. During transients, which cause a damped precessional motion of the axis, the passive radial bearings react the small torques associated with this motion, and the active radial bearings react the radial forces.

When the vehicle is parked, even on a hill, the spin axis is very close to vertical, just as in steady driving. The spring forces exerted by the power leads produce a torque tending to align the axis perpendicular to the hill, but these forces advantageously are small enough to keep the resulting offset from vertical negligibly small. With a vertical orientation of the rotor axis when the vehicle is stationary, only the axial bearing need be active, there being no radial forces to react. The bearing control system then finds a position of equilibrium at which the permanent magnet axial force and the force of gravity cancel, so that no current is needed in the control windings, thus reducing the overall power drain to the small amount used by the logic circuits. A quiescent power drain of less than 0.25 watt when parked can be achieved by this design. This drain, when combined with a residual rotor aerodynamic loss due to imperfect vacuum of 0.25 watt, results in a self discharge time of more than four months.

Another object of the present invention is to provide liquid cooling of the motor-generator (17) under all driving conditions, the most demanding of which is a repetitive stop and go schedule. During this cyclic use, of the motor-generator (17), is alternately delivering power as a generator when accelerating the vehicle or accepting power as a motor during dynamic braking. Even though it is advantageously very efficient in both operating modes, the high powers involved, e.g., many tens of kilowatts, create iron and copper losses which would lead to destructive temperatures in the motor-generator (17) if it were not cooled. The present invention provides effective cooling of the motor-generator stator (21a) by circulating flotation liquid (9) through a re-entrant passageway in the vacuum housing (10), as illustrated in FIG. 5. The flow path contains the cylindrical surface of the vacuum housing (35) which is in intimate contact with the stator (21) and the portion of the outer housing (8) containing cooling fins (36). These regions are connected by apertures in the south polar cap (34) of the inner housing (10). The liquid (9) is pumped along this path by an electric motor whose helically wound stator (30) forms an annulus contained within its permanent magnet rotor (37) to which turbine blades (31), (38) are attached. Vanes (32) and (33) which are figures of revolution are used to direct the flow liquid (9) along this path. Since the magnetic bearings provide no thermal conduction path from the rotating shaft (18) outward, the motor-generator rotor (21b) is cooled solely by radiation. The shaft temperature needed for this thermal radiation can be maintained within acceptable limits by using a motor-generator design, which minimizes rotor losses, conducting the rotor heat along the entire length of the shaft to maximize the area available for radiation, and providing a spherical boundary into which the radiation occurs with a temperature only slightly above that of the ambient air. This condition is achieved by allowing free convection of the liquid (9) throughout the annular space between the spherical surfaces of housings (8) and (10).

Another object of the present invention is to protect the vehicle and its passengers from (a) accidental sudden release of the stored energy or (b) transfer of angular momentum, events which could be caused by a collision or by a failure of the flywheel (1). Although the energy of a full charge is only equivalent to that resulting from the burning of six ounces of gasoline, its potentially dangerous form of release must be considered. Preferably, four barriers are provided between the rotor (100) and the outside: the vacuum housing (10) the liquid (9), the outer enclosure (8), and the outer wrapping (41). Almost all of the energy is stored in the fiber composite material, which becomes a harmless blob when it disintegrates. The present invention advantageously uses no metals in locations operating at high velocity, thus precluding the creation of metallic projectiles of sufficient energy to penetrate the barriers. The heat released by a full charge will produce an increase the temperature in the fluid of approximately two hundred degrees, causing no significant hazard.

The sudden transfer of the rotor's angular momentum to the vehicle could jerk the vehicle dangerously, if it were permitted to happen. This is precluded in the present invention by allowing the vacuum housing (10) to spin down gradually in the liquid (9) when pins in the mechanical gimbal (39a) shear in the event of a bearing seizure or rotor disintegration. This detail (40) is shown in FIG. 8.

The foregoing description of a preferred embodiment of the invention has been presented for the purposes of illustration and description. It is not intended to be exhaustive or to limit the invention to the precise form disclosed, and many modifications and variations are possible in light of the above teaching. The embodiment was chosen and described in order to best explain the principles of the invention and its practical application to electric vehicles, thereby enabling others skilled in the art to best utilize the invention in various embodiments and with various modifications as are suited to the particular vehicle use contemplated. It is intended that the scope of the invention be defined by the claims appended hereto.

What is claimed is:

1. A flywheel support system for a flywheel-motor-generator assembly providing mobile energy storage, said support system including a liquid suspension system comprising:

an outer housing;

a vacuum housing disposed within said outer housing, wherein said vacuum housing and said outer housing define a cavity;

a radiator operatively attached to said outer housing; and a pump disposed within said cavity for circulating a liquid in a predetermined portion of said cavity so as to transfer waste heat to said radiator.

2. The flywheel support system as recited in claim 1, wherein a stator of said flywheel-motor-generator is disposed proximate to said predetermined portion of said cavity.

3. The flywheel support system as recited in claim 1, further comprising a plurality of shearable support members operatively disposed between said outer housing and said vacuum housing.

4. The flywheel support system as recited in claim 1, wherein the flywheel-motor-generator assembly has a respective center of mass, wherein said vacuum housing has an associated center of buoyancy and wherein said center of buoyancy is disposed with respect to said center of mass so as to produce a righting moment applied to the flywheel-motor-generator assembly.

5. The flywheel support system as recited in claim 4, wherein said righting moment is applied to a rotor axis of the flywheel-motor-generator assembly so as to permit alignment of the rotor axis along a vertical when an associated vehicle is parked irrespective of orientation of the vehicle.

6. The flywheel support system as recited in claim 1, wherein said liquid outside of said portion is circulated by convection so as to maintain said vacuum housing wetted by said liquid outside of said portion at ambient temperature.

7. A flywheel support system for a flywheel-motor-generator assembly providing mobile energy storage, said support system including a bearing support system comprising:

a magnetic active radial bearing disposed in a predetermined plane about an axial shaft of the flywheel-motor-generator assembly;

a plurality of magnetic passive radial bearings;

a plurality of magnetic active axial bearings, wherein at least one of said active axial bearings is disposed proximate to an end of said shaft a magnetic passive axial bearing;

plurality of proximity sensors located equidistant from said shaft for determining a position of said shaft within a cylinder defined by said proximity sensors; and a control system for controlling said active radial bearing and said active axial bearings in response to signals produced by said proximity sensors.

8. The flywheel support system as recited in claims 7, wherein said control system controls said active radial bearing and said active axial bearings so as to enable reduction of a gap between said shaft and said cylinder.

9. The flywheel support system as recited in claim 7, wherein said active radial bearing is disposed proximate to a center of mass of the flywheel-motor-generator assembly.

10. The flywheel support system as recited in claim 7, wherein force generated by said active radial bearing is adjusted in response to said signals so as to maintain a predetermined clearance between said shaft and said cylinder in response to vehicle accelerations.

11. The flywheel support system as recited in claim 7, wherein said passive radial bearings counteract torques produced during vehicle acceleration resulting from axial displacement of a center of mass of a stator in the flywheel-motor-generator assembly and by hydrodynamic forces on a mechanical gimbal during vehicle rotations.

12. The flywheel support system as recited in claim 7, wherein said active axial bearings support the weight of the flywheel-motor-generator assembly against gravity and during vertical accelerations.

13. The flywheel support system as recited in claim 7, wherein said cylinder is located coincident with a stator of the flywheel-motor-generator.

14. The flywheel support system as recited in claim 13, wherein said cylinder is located coincident with the stator of the flywheel-motor-generator so as to minimize loss of clearance between said shaft and said stator.

15. The flywheel support system as recited in claim 7, wherein said passive axial bearing supports the weight a rotor of the flywheel-motor-generator assembly when said control system is turned OFF.

16. The flywheel support system as recited in claim 7, said proximity sensors further comprising:

a plurality of first proximity sensors located in a first plane equidistant from centerline of said shaft; and a plurality of second proximity sensors located in a second plane equidistant from said centerline of said shaft;

wherein said first proximity sensors and said second proximity sensors define said cylinder, wherein said cylinder is substantially coincident with a motor-generator of the flywheel-motor-generator assembly, wherein said first plane is disposed substantially parallel to said second plane, and wherein said control system controls said active radial bearing and said active axial bearings in response to respective signals produced by said proximity sensors, said control signals being combined in said control system to approximate at least one virtual proximity sensor located equidistant between said first plane and said second plane.

17. The flywheel support system as recited in claim 7, wherein said proximity sensors are disposed about first and second circles of intersection between said cylinder and respective first and second planes, said first plane being disposed orthogonal to said second plane, wherein said cylinder is substantially coincident with a motor-generator of the flywheel-motor-generator assembly, and wherein said control system controls said active radial bearing and said active axial bearings in response to respective signals produced by said proximity sensors, said control signals being combined in said control system to approximate at least one virtual proximity sensor located a predetermined distance from said first plane.

18. The flywheel support system as recited in claim 7, wherein said cylinder is a right circular cylinder.

19. A safety system for a high energy density flywheel assembly, comprising:
- a vacuum housing;
- an energy absorbing suspension fluid;
- an outer housing;
- a mechanical gimbal operatively coupling said vacuum housing to said outer housing; and
- a reinforcing wrapping,
- arranged to form a multiple barrier and energy dissipation means for protecting a vehicle and associated passengers from accidental release of energy from the flywheel assembly.

20. The safety system as recited in claim 19, wherein said mechanical gimbol includes shearable gimbal pins protecting the passengers and the vehicle from sudden transfer of angular momentum resulting from bearing seizure of at least one of a plurality of bearing or contact between said vacuum housing and said flywheel assembly, wherein gimbal pins in respective said gimbal pins shear and permit said vacuum housing to gradually spin down against the fluid disposed between said vacuum housing and said outer housing.

* * * * *